United States Patent Office 3,264,861
Patented August 9, 1966

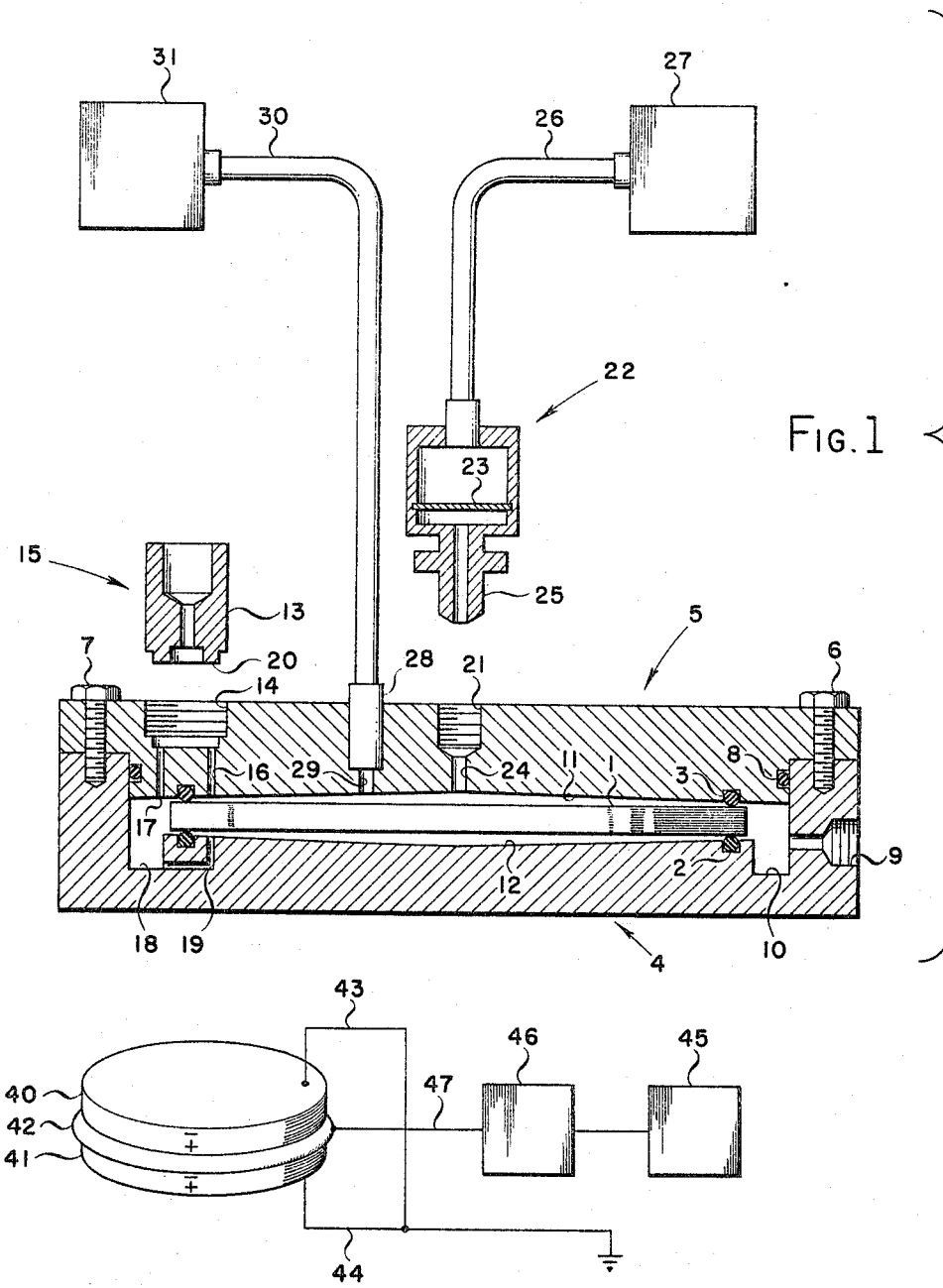

3,264,861
DYNAMIC PRESSURE GENERATOR
Duane O. Miles, Sunnyvale, Calif., assignor to Lockheed
Aircraft Corporation, Burbank, Calif.
Filed June 8, 1964, Ser. No. 373,158
6 Claims. (Cl. 73—4)

This invention relates to a pressure generator capable of producing measurable sinusoidal pressures over a wide range of frequency and, more particularly, to a device suitable for the dynamic pressure calibration of pressure gauges over a frequency range encompassing the natural resonant frequency regions of such devices. The invention further relates to a piezoelectric self-excited diaphragm configuration, hereafter referred to as the driver configuration, utilized to produce the sinusoidal-pressures in the device.

The necessity for developing a device suitable for calibrating the dynamic pressure response of pressure gauges, particularly in their resonant frequency regions, has long been recognized. In common with other physical systems, the compliant, that is pressure sensitive, element of such gauges exhibits one or more characteristic resonant frequency regions which distort the true amplitude of pressure waves impinging on the element. Such distortions cause the gauge to record erroneous pressure outputs for the environment being measured.

To date, no satisfactory method exists by which it is possible to calibrate the pressure response of such gauges as a function of the frequency of an applied sinusoidal pressure over a frequency range including the natural resonant frequency region of the gauge.

Pistonphones, sirens, loudspeakers and shock tubes have been employed in an attempt to dynamically calibrate pressure gauges. Burst diaphragm devices, see for example, U.S. Patent 2,574,475, issued November 12, 1951, have also received much attention. However, none of these approaches yield accurate, detailed, and reliable information relative to the complete dynamic response of the pressure gauge.

A more recent attempt to construct an apparatus for determining the dynamic pressure response of pressure gauges was reported by Perls, Miles and Wilner in an article entitled, "Sinusoidal Pressure Generator With Wide Amplitude and Frequency Ranges," published in the February, 1960, issue of "The Journal of the Acoustical Society of America," pp. 274–281. As therein reported, however, the frequency-response curves obtained with the pressure gauge mounted in the device give gauge outputs under loading conditions which are very different from the ones in actual use of the gauge and, in addition, show frequency-dependent characteristics of the device itself. Furthermore, as shown by FIG. 11 of said article, the device is fundamentally insensitive to changes in diaphragm resonance for all gauges with resonant frequency below 10 kc., where most commercial pressure gauges have resonances. Hence, the sinusoidal pressure generator is for basic reasons unsuitable for use as a dynamic calibrator of pressure gauges below 10 kc.; and, furthermore, for practical reasons is unusable as such a dynamic calibrator above 10 kc.

In accordance with the invention is described a driver configuration for producing sinusoidal pressures and, further, a pressure generating device utilizing the driver configuration particularly suitable for calibrating the dynamic pressure response of pressure gauges below, through, and above the resonant frequency regions of such gauges.

More particularly the driver configuration comprises a first and a second similar polarized piezoelectric element and an electrode. The two piezolelectric elements and the electrode are joined in a fixed relationship with the positive face of the first piezoelectric element and the negative face of the second piezoelectric element contacting opposing surfaces of the electrode. Means are provided for electrically grounding the negative face of the first piezoelectric element and the positive face of the second piezoelectric element, and for applying a voltage to the electrode.

The pressure generating device of the invention utilizes the aforementioned driver configuration. Means are provided for forming a chamber on one or both surfaces of the driver member. Additional means are provided for filling the chamber with a fluid. A sinusoidal voltage applied to the electrode of the driver member causes the member to deflect and produce a volume change in the chamber. In response to this volume change, the fluid in the chamber changes pressure, the instantaneous pressure so generated being readily determinable. In the preferred embodiment a pressure detecting device is connected with the chamber. Knowing the value of the dynamic pressure to which the pressure detecting device is exposed, a record of the output behavior of the detecting device constitutes a direct calibration of the detecting device at specific superimposed static and dynamic pressures. By varying the frequency of the applied voltage the detecting device is readily calibrated through its entire frequency region, including resonance.

Although it was desired to utilize the advantageous characteristics of piezolelectric materials in the driver configuration of the invention, a major problem was encountered in making the deflection of the driver member large enough to produce significant dynamic pressures in the device. It was determined that ordinary volume or linear expansion mode piezolelectric elements produce sinusoidal pressure changes too infinitesimal to be of use in the calibration of pressure gauges. Even the use of a multiplicity of piezoelectric elements arranged mechanically in series and electrically in parallel was unsatisfactory. This difficulty is eliminated by the driver configuration of the invention whereby dynamic pressure amplitudes up to 10 p.s.i. and higher are readily produced. In contrast, the aforementioned device of Perls, Miles and Wilner is limited to maximum generated pressures in the order of 0.04 p.s.i. when gas is employed as the coupling fluid.

To successfully measure the resonance of a structure by the increase of its amplitude of oscillation as it is driven through its resonant frequency, the compliance of the driver member should be greater than that of the structure. In accordance with the invention it has been determined that this criterion is always satisfied by utilizing a gas coupling medium between the driver member and the driven member of the pressure gauge. In calibrating the dynamic response of gauges which are to be used in a gas environment, the invention is limited to the use of a gas coupling medium since it has been determined liquid mediums are not suitable and, in fact, preclude the obtaining of pressure gauge calibration curves in the vicinity of resonance. Commensurate with the preceding discussion, liquid coupling medium do not possess the requisite degree of compliancy to permit calibration in the resonant frequency region. Additionally, it has been found that liquid coupling mediums increase the effective mass and damping of the compliant element of the driven member with a resulting change in frequency and amplitude in the oscillations of the element. This also prevents calibration of the gauge in its resonant frequency regions.

However, the above discussion of gas coupling media is not meant to exclude the possibility of making the driver member thin enough to exhibit greater compliance than the driven member being calibrated. As may be seen in a later section, in which the mathematical equations for the system are discussed, the compliance criteria may be fulfilled in this manner. Then, a fluid coupling medium other than a gas may be employed, in those specific instances where the gauge to be calibrated is to be utilized in a non-gaseous environment. For example, when it is desired to determine the dynamic response for a pressure gauge to be employed in an underwater environment, the coupling medium would preferably be water, so as to simulate the actual damping and effective mass effects to be encountered. To satisfy the compliance criteria, however, under these conditions, would require that a piezoelectric driver be especially designed according to the equations for that particular pressure gauge, such that the driver compliance was greater than that of the pressure gauge element.

A more complete understanding of the invention is facilitated by reference to the drawing, in which:

FIGURE 1 is an elevation view, partly in section, of one embodiment of a pressure generator of the invention; and FIGURE 2 is a perspective view of one embodiment of the driver configuration of the invention.

Referring more specifically to FIGURE 1, there is shown one embodiment of the device of the invention wherein a driver member 1 is supported by two O-rings 2 and 3 between housing members 4 and 5. Driver member 1 is described more fully in conjunction with FIGURE 2 of the drawing. Housing members 4 and 5 are mated by means of screws 6 and 7, with O-ring 8 being provided to ensure a gas tight seal therebetween. Duct 9 extending substantially radially through housing 4 serves in conjunction with cavity 10 as means for connecting driver member 1 with the outside surface of housing 4. In the embodiment of FIGURE 1, duct 9 is fitted with a conventional glass-to-metal feed-through and coaxial connector, not shown, through which an electrical lead extends to electrically connect member 1 with an outside power source. Member 1 is electrically grounded to housing members 4 and 5 by means of O-rings 2 and 3 respectively, which in this embodiment are metal. In those embodiments where insulating O-rings are used, grounding leads as shown in FIGURE 2 are utilized.

Chambers 11 and 12 are defined by opposing surfaces of member 1 and housing members 4 and 5, respectively. O-rings 2 and 3 ensure that the chambers are substantially sealed from external influences. Gas inlet valve 13 threadably received in housing 5 by means of hole 14 permits filling the chambers with a gas and adjusting the static pressure thereof. The gas enters valve 13 through a standard tubing fitting 15 and proceeds along two routes; (i) through orifice 16 into chamber 11, and (ii) through orifice 17 into cavity 18 and via orifice 19 into chamber 12. The gas inlet valve is provided with a sealing flange 20 whcih seats directly over orifices 16 and 17. When valve 13 is closed, chambers 11 and 12 are isolated from each other and sealed from external influences. A threaded hole 21 is provided in housing 5 to threadably receive a pressure gauge 22 prior to filling chamber 11 with a gas. The compliant element 23 of the gauge is exposed to chamber 11 by means of orifice 24. Adapter 25 permits gauge 22 to be threadably mounted in hole 21. The response of gauge 22 to incident pressures on compliant element 23 is transmitted via connection 26 to recorder 27. In the embodiment of FIGURE 1, a pressure monitor 28 is shown mounted in housing 5, for example, in similar fashion to gauge 22, and exposed to chamber 11 by means of orifice 29. The detected pressure in chamber 11 is transmitted via connection 30 to recorder 31. A variety of pressure devices are known to the art and the invention is not limited to the use of any particular device for depicted elements 22 and 28. Illustrative of such devices are (i) the capacity type wherein the capacitance between two plates is changed by incident pressure; (ii) a piezoelectric device; and (iii) a strain gauge glued on the back surface of a compliant element. In each of these devices a voltage change caused by the generated pressure in chamber 11 is monitored by recorders 27 and 31, respectively.

It has been determined that gauge 22 may be connected to chamber 11 by means of a length of tubing mounted in hole 21 with the gauge being mounted in the end of the tubing remote from housing 5. The added length of the gas column so realized does not significantly effect accurate calibration of the gauge. The effect of adding lengths of tubing is to increase the volume of gas, and therefore to reduce somewhat the amplitude of the dynamic pressure environment. Additionally, a new determinable resonance, due to the length of tubing, appears in the dynamic calibration curve. It is to be further understood that a plurality of gauges may be connected to chambers 12 and 13 and simultaneously calibrated.

To maximize accuracy of the calibrated gauge, the gauge should theoretically be calibrated under conditions corresponding to those encountered in the environment in which the gauge is intended to operate. This would involve, for example, utilizing a gas coupling medium in the device of the invention and a static and dynamic pressure therefor which conform to the anticipated environmental conditions.

In actuality, however, the device is not so limited. When it is not feasible to so match gases, it has been determined that dry nitrogen and air, for example, generally permit accurate calibrations over a wide range of operating environments. It has been further determined that the amplitude of the dynamic pressure of the gas is directly proportional to the static pressure of the coupling medium. For example, the amplitude curve obtained under ten atmospheres static pressure is ten times the amplitude of the curve obtained under one atmosphere pressure. Accordingly, knowing the approximate static pressure in the operational environment and the pressure in the gas chamber of the device of the invention, the appropriate adjustments may be made to make the calibration curves of the gauge appropriate for the operational environment.

With respect to the dynamic pressure amplitude, some pressure gauges may be designed for use at dynamic pressures of several thousand pounds per square inch, which is above the contemplated dynamic pressure amplitude capability of existing versions of the subject invention. However, it has been determined by calibrating such gauges that the calibration obtained for the pressure gauge at low dynamic amplitude is valid at higher amplitudes as long as the gauge response is linear. Since most pressure gauges are designed to be linear throughout their operating range, the subject invention is applicable to dynamic calibration of even high amplitude pressure gauges, and has been employed to validly determine the dynamic response of several such high range gauges commercially available.

The resonant frequency peak of the gauge is a function of the static pressure of the gas coupling medium, with increasing pressures tending to shift the peak towards higher frequencies. The shift is generally not large, however, and for normal static pressures can sometimes be ignored. When the static pressure dependence of the resonant frequency of the unknown gauge is needed, however, this effect may be conveniently obtained with the subject invention. No other method is known, whereby such behavior may be experimentally determined, since a wide range of static pressure cannot be maintained in shock tubes, and resolution is to poor in sirens, explosive chambers, and the like.

The amplitude of the resonant peak of the gauge is also a function of the static pressure of the gas coupling medium. As pressure is increased, the resonant amplitude at first increases, reaches a maximum, and then decreases. This behavior can be readily obtained for the gauge using the subject invention. Such effects have been theoretically predicted, and are of great importance to the users of pressure gauges. However, no means has heretofore existed by which such behavior may be experimentally determined in detail.

In general, it is considered desirable to use static pressures of at least 0.1 p.s.i. in the device of the invention so as to produce usable pressure changes in the chamber of the device. Maximum static pressures are in general determined by economic considerations involved in designing pressure chambers with pressures in the order of 3000 p.s.i. being considered practical. In some instances, the compliant element of the gauge being calibrated may impose a lower pressure limit. At some elevated pressure, dependent on the gauge being calibrated, the coupling medium becomes sufficiently dense so that its damping action on the compliant element causes a decrease in sensitivity of the element, both in the resonance and the subresonance regions.

Maximum pressure changes in the chamber of the device are realized when the gas is constrained in a sealed chamber. However, the decreases in pressure attributable to small gas leaks in the chamber are significant only at low frequencies. For example, one version of the invention having a 1 cc. volume gas chamber was operated with an opening in the chamber approximately 0.05 cm. in diameter. A rapid decay in the output amplitude of the gauge being tested occurred at frequencies below 30 c.p.s. No decay occurred above this frequency. Such behavior can be completely avoided, and calibrations conducted at essentially static or zero frequency conditions, by eliminating all gas leaks in the chamber.

The shape of gas chambers 11 and 12 of FIGURE 1 is not critical. However, chambers in the shape of spherical segments are generally preferred since by minimizing gas volumes, the relative volume change, and accordingly pressure change generated by driver member 1, is maximized. Maximum generated pressures are further realized by utilizing substantially the full deflection of the driver member. As shown in FIGURE 1, this is accomplished by forming the gas chamber essentially around the outer periphery of the deflected driver member.

As previously discussed, either or both gas chambers 11 and 12 of FIGURE 1 may be utilized in the calibration of pressure gauges. Since the chambers are sealed from each other and operate independently, the use of only one chamber permits modification of the device of FIGURE 1 so as to eliminate the unused chamber. When both chambers are utilized, the preceding considerations permit with modifications the use of differing gas coupling mediums at different pressures in the chambers if desired.

FIGURE 2 of the drawing depicts one embodiment of the piezoelectric drive rconfiguration of the invention. As therein shown, the driver member comprises two polarized piezoelectric disc elements 40 and 41 joined to and separated by common electrode disc 42. The positive face of disc 40 and the negative face of disc 41 contact opposite sides of electrode 42. The remaining face of each disc is electrically grounded, as shown, by leads 43 and 44. Means comprising a frequency generator 45 and a power amplifier 46 are provided for impressing a voltage on electrode 42 via lead 47.

A voltage, positive with respect to ground, applied to electrode 42 will cause the driver member to deflect, with the upper face of disc 40 exhibiting a concave surface and the lower face of disc 41 exhibiting a convex surface. An applied voltage that is negative with respect to ground causes a similar deflection in the opposite direction. As depicted in FIG. 1 of the drawing, the driver member is supported around its outer periphery by O-rings 2 and 3. In an alternative embodiment, not shown, the driver member may be simply clamped around its periphery by housing members 4 and 5.

In the embodiment of FIG. 2, electrode 42 is a beryllium-copper disc approximately 0.003 inch in thickness. For convenience in making electrical contact thereto, the electrode is shown as having a larger diameter than the piezoelectric elements. Elements 40 and 41 are each one-eighth inch thick discs, two inches in diameter. The discs are joined to the electrode by conventional methods known to the art. In this embodiment, an epoxy resin adhesive containing ten parts Shell Epon #828 resin and one part triethylene tetramine was found to give adequate bonding strength. It has been determined that both conductive and non-conductive adhesives are suitable. Other methods of forming the driver configuration of the invention are considered within the skill of the art. For example, electrode 42 may be formed by plating a suitable lectrode material on one or both piezoelectric elements which are then mated together.

It has been determined that a gain in the dynamic pressure generated by the driver member is realized as the radius of the member is increased in relation to its total thickness. Although a lowering of the resonant frequency characteristic of the driver member also occurs, this loss is not of the same magnitude as the increase in pressure amplitude. As will be subsequently discussed in greater detail, the increase in pressure is proportional to the radius cubed while the resonant frequency lowering is proportional to the radius squared. A radius to thickness ratio of 8 to 16 is generally utilized, although ratios up to 32 are considered desirable. However, the invention is not so limited, with smaller or larger ratios being utilized commensurate with the preceding discussion.

The piezoelectric elements of the driver member are formed of a material exhibiting piezoelectric characteristics when subjected to electric forces. Ceramic materials are to be preferred over available single crystals since the transverse piezoelectric coefficient is radially isotropic in ceramics, but not necessarily so in crystals. The particular choice of material is considered within the skill of the art. For that embodiment depicted by FIGURE 2 of the drawing, a polarized lead-zirconium titanate ceramic was utilized.

Although the utility of the driver member depicted by FIGURE 2 has been discussed in terms of its incorporation in the pressure generator device of the invention, other uses therefor will be apparent to those skilled in the art. For example, the driver member is readily adaptable for use as a pressure gauge with the inverse piezoelectric effect causing the member to produce a proportional voltage response, as the active element in a remotely operated gas reduction valve, or as a loudspeaker or microphone element.

OPERATION

With reference to FIGURES 1 and 2, a test pressure gauge 22 is threaded in hole 21 in the aforementioned manner and chamber 11 filled with a volume of gas $V_0$ at a static pressure $P_0$. A sinusoidal voltage $E_0 \sin \omega t$ is supplied to the piezoelectric driver member 1, which member deflects so as to cause a volume change $\Delta V = V_m \sin \omega t$ in the chamber 11. ($V_m = \pi \gamma_0^3 d_{31} E_0 / 2T$, where $\gamma_0$ is the driver radius, $d_{31}$ is the transverse piezoelectric coefficient, $E_0$ is the zero to peak voltage supplied to the driver, and T is the driver thickness.) In response to this volume change, the gas in chamber 11 changes pressure, the instantaneous pressure being given by the formula $$P = P_0 \sum_{n=0}^{\infty} (V_m \sin \omega t / V_0)^n$$

In the preceding manner it is possible to determine the instaneous pressure P to which the test gauge is subjected. From the equations it is apparent that the instantaneous pressure P is increased by maximizing $\gamma_0$, $d_{31}$, $E_0$ and $P_0$ and by minimizing T and $V_0$. However, it is also apparent from the equation for P and the trigonometric identities $$\sin^2 \omega t = (1 - \cos 2\omega t)/2, \quad \sin^3 \omega t = (3 \sin \omega t - \sin 3\omega t)/4$$

etc. that P will not be a pure sine wave unless $V_m \ll V_0$. A pure sine wave is considered desirable since it is difficult to isolate dynamic pressures of particular frequencies for dynamic response calibration. In practice, the criterion $V_m \ll V_0$ is not difficult to achieve. In a typical model of the invention, the amount of resonance excited at one-half and one-third the resonant frequency by second and third harmonic was, respectively, 5% and 2%, and was so narrow in frequency as to be negligible.

The resonant frequency of the piezoelectric driver is given by $f_{RD} = (0.233 T/\gamma_0^2)[Y/\rho(1-\gamma^2)]^{1/2}$, where $Y$, $\rho$, and $\gamma$ are the Young's modules, density and Poisson's ratio, respectively, of the piezoelectric driver material. Theoretically, it is desirable that $f_{RD}$ be as large as possible so that the test gauge need not be calibrated through the resonance region of the device. By making T, Y and $\gamma$ as large as $\gamma_0$ and $\rho$ as small as possible, $f_{RD}$ is maximized. It is noted that $\gamma_0$ appears to the third power in the equation for $V_m$ and to the second power in the equation for $f_{RD}$. Accordingly, by increasing $\gamma_0$, more is gained in dynamic pressure amplitude than is lost in resonant frequency.

In practice, however, it is not necessary to maximize $f_{RD}$ to obtain accurate calibration curves for the test gauge. If all of the variables in the preceding equations are manipulated so as to maximize the dynamic pressure without regard to the magnitude of the resonant frequency characteristic of the driver member, the Q factor of the driver resonance is lowered. Accordingly, although the resonance moves downward in frequency, it becomes broader and of less amplitude at the same time. This distortion is easily determined and can be manually or electrically eliminated from the response of the test gauge to give accurate calibration readings. For example, the substitution of a calibrated pressure gauge for test gauge 22 permits measurement of the distortion prior to the calibration of gauge 22.

As a more accurate alternative to the preceding method of calculating the dynamic pressure in chamber 11, a pressure monitoring device 28, for example, a calibrated piezoelectric pressure gauge of very high resonant frequency, as shown in FIGURE 1, is utilized to monitor the pressures in chamber 11. Further, by means of the monitoring device, the increase in amplitude in generated pressure in chamber 11 occurring in the resonant region of the driver member is detected. Power amplifier 46 is accordingly adjusted to maintain a constant generated pressure in the chamber, or a ratio circuit may be employed to correct the gauge output or adjust the driver input amplitude via a servomechanism.

Knowing the value of a constant dynamic pressure to which the test gauge is exposed, the test gauge response is recorded as the frequency thereof is varied by means of frequency generator 45. A record of this output behavior of the test gauge constitutes a direct dynamic calibration of the gauge at a specific pressure. For example, if recorder 27 is a vacuum tube voltmeter, the response of the gauge can be plotted on coordinates of voltage versus frequency for a specific pressure. Also, the curve may be plotted on coordinates of indicated pressure versus frequency for a specific pressure. Calibration of the gauge at various known generated pressures gives response characteristics appropriate to the pressures anticipated to be encountered in the environment in which the gauge is intended to operate.

While certain preferred embodiments of the invention have been specifically disclosed herein, it is understood that the invention is not so limited. Many variations will be apparent to those skilled in the art and the invention is to be given the broadest interpretation within the scope of the appended claims.

What is claimed is:
1. A pressure gauge calibrating device comprising:
 (a) a driver member for producing sinusoidal pressures having two opposing major plane surfaces,
 (b) a housing enclosing and supporting said driver member, said housing forming at least one gas chamber on one of the said opposing major surfaces of said driver member,
 (c) means for introducing a gas coupling medium at a desired pressure into said gas chamber,
 (d) means connected with said housing for maintaining at least one dynamic pressure detecting device in contact with the gas coupling medium in said gas chamber,
said driver member comprising:
 (e) an electrode having two opposing major plane faces,
 (f) a first polarized piezoelectric element having two major plane surfaces of opposite polarity,
  the positive major surface of said first piezoelectric element contacting one of said major faces of said electrode,
 (g) a second polarized piezoelectric element having two major plane surfaces of opposite polarity,
  the negative major surface of said second piezoelectric element contacting the opposing major face of said electrode, and
 (h) means contacting said driver member adapted to electrically activate said driver member by applying a sinusoidal voltage to said member.

2. A pressure gauge calibrating device in accordance with claim 1 wherein the means connected with said housing are at least one passageway extending through said housing and connecting the outer surface of said housing with one of said gas chambers, said passageway being adapted to receive a pressure detecting device and maintain said device in contact with said gas coupling medium in said gas chamber.

3. A pressure gauge calibrating device in accordance with claim 2 wherein said pressure detecting device is a pressure gauge to be calibrated.

4. A pressure gauge calibrating device in accordance with claim 3 wherein another passageway receives a pressure gauge monitoring instrument for monitoring pressure generated in the one of said gas chambers.

5. A pressure gauge calibrating device in accordance with claim 1 wherein the means connected with said housing are at least one passageway extending through said housing and connecting the outer surface of said housing with one of said gas chambers, said passageway being adapted to receive a coupling member extending beyond the outer surface of said housing, said coupling member being adapted to receive a pressure detecting device and maintain said device in contact with said gas coupling medium in said gas chamber.

6. A pressure calibrating device in accordance with claim 5 wherein the pressure detecting device is a pressure gauge to be calibrated.

References Cited by the Examiner
UNITED STATES PATENTS

| | | | |
|---|---|---|---|
| 3,033,027 | 5/1962 | Perls et al. | 73—4 X |
| 3,054,084 | 9/1962 | Parsinen | 310—8.6 |
| 3,107,630 | 10/1963 | Johnson | 310—8.6 |

LOUIS R. PRINCE, *Primary Examiner.*

S. CLEMENT SWISHER, *Assistant Examiner.*